(12) United States Patent
Arsovic

(10) Patent No.: US 9,821,316 B2
(45) Date of Patent: Nov. 21, 2017

(54) RECYCLING APPLIANCE

(71) Applicant: Milorad Arsovic, Burlington (CA)

(72) Inventor: Milorad Arsovic, Burlington (CA)

( * ) Notice: Subject to any disclaimer, the term of this patent is extended or adjusted under 35 U.S.C. 154(b) by 356 days.

(21) Appl. No.: 14/675,802

(22) Filed: Apr. 1, 2015

(65) Prior Publication Data

US 2016/0288996 A1 Oct. 6, 2016

(51) Int. Cl.
| | | |
|---|---|---|
| *B02C 18/00* | (2006.01) | |
| *B02C 18/22* | (2006.01) | |
| *B30B 9/30* | (2006.01) | |
| *B65B 31/02* | (2006.01) | |
| *B65B 63/02* | (2006.01) | |
| *B65F 1/14* | (2006.01) | |
| *B30B 9/32* | (2006.01) | |
| *B65B 1/26* | (2006.01) | |
| *B65F 1/00* | (2006.01) | |
| *B65F 1/06* | (2006.01) | |

(52) U.S. Cl.
CPC ...... *B02C 18/2241* (2013.01); *B02C 18/2291* (2013.01); *B30B 9/301* (2013.01); *B30B 9/3007* (2013.01); *B30B 9/3035* (2013.01); *B30B 9/3039* (2013.01); *B30B 9/321* (2013.01); *B65B 1/26* (2013.01); *B65B 31/024* (2013.01); *B65B 63/02* (2013.01); *B65F 1/0033* (2013.01); *B65F 1/14* (2013.01); *B65F 1/1405* (2013.01); *B65F 1/06* (2013.01); *B65F 2001/1489* (2013.01); *B65F 2210/152* (2013.01); *B65F 2210/167* (2013.01); *B65F 2210/168* (2013.01); *B65F 2210/169* (2013.01); *B65F 2210/188* (2013.01); *B65F 2240/112* (2013.01); *B65F 2240/12* (2013.01); *B65F 2240/156* (2013.01); *Y02W 30/10* (2015.05); *Y02W 30/64* (2015.05)

(58) Field of Classification Search
CPC .................. B02C 18/2291; B02C 18/2241
See application file for complete search history.

(56) References Cited

U.S. PATENT DOCUMENTS

| | | | | |
|---|---|---|---|---|
| 3,595,389 A | * | 7/1971 | Morgan | B03B 9/06 209/705 |
| 4,949,528 A | * | 8/1990 | Palik | B09B 3/00 209/547 |
| 5,423,431 A | * | 6/1995 | Westin | B07C 5/02 198/442 |

(Continued)

FOREIGN PATENT DOCUMENTS

| | | |
|---|---|---|
| CA | 2067813 | 2/1992 |
| CA | 2236217 | 5/1997 |

(Continued)

OTHER PUBLICATIONS

Herbert, ISR and WOSA dated Jun. 23, 2016.

*Primary Examiner* — Faye Francis

(57) ABSTRACT

A recycling appliance is for processing non-organic recyclable materials and organic materials. The recycling appliance includes a non-organic processing assembly configured to receive, process and store the non-organic recyclable materials. An organic processing assembly is spaced apart from the non-organic processing assembly. The organic processing assembly is configured to receive, process and store the organic materials. A housing assembly is configured to house the non-organic processing assembly and the organic processing assembly.

20 Claims, 13 Drawing Sheets

(56) References Cited

U.S. PATENT DOCUMENTS

| | | | |
|---|---|---|---|
| 5,447,017 | A | 9/1995 | Becher et al. |
| 5,607,112 | A | 3/1997 | Wilson |
| 5,695,114 | A | 12/1997 | Evans |
| 5,950,800 | A * | 9/1999 | Terrell ............... B65G 47/1492 198/448 |
| 6,425,487 | B1 | 7/2002 | Emmott et al. |
| 2011/0056952 | A1 | 3/2011 | Borowski et al. |
| 2013/0220149 | A1 | 8/2013 | Preen et al. |
| 2014/0060347 | A1 | 3/2014 | Yazdi |

FOREIGN PATENT DOCUMENTS

| | | |
|---|---|---|
| CA | 2712799 | 7/2009 |
| CA | 2667676 | 11/2009 |
| FR | 2694273 | 2/1994 |
| FR | 2698024 | 5/1994 |
| WO | 2005068080 | 7/2005 |
| WO | 2007071933 | 6/2007 |
| WO | 2015036634 | 3/2015 |

\* cited by examiner

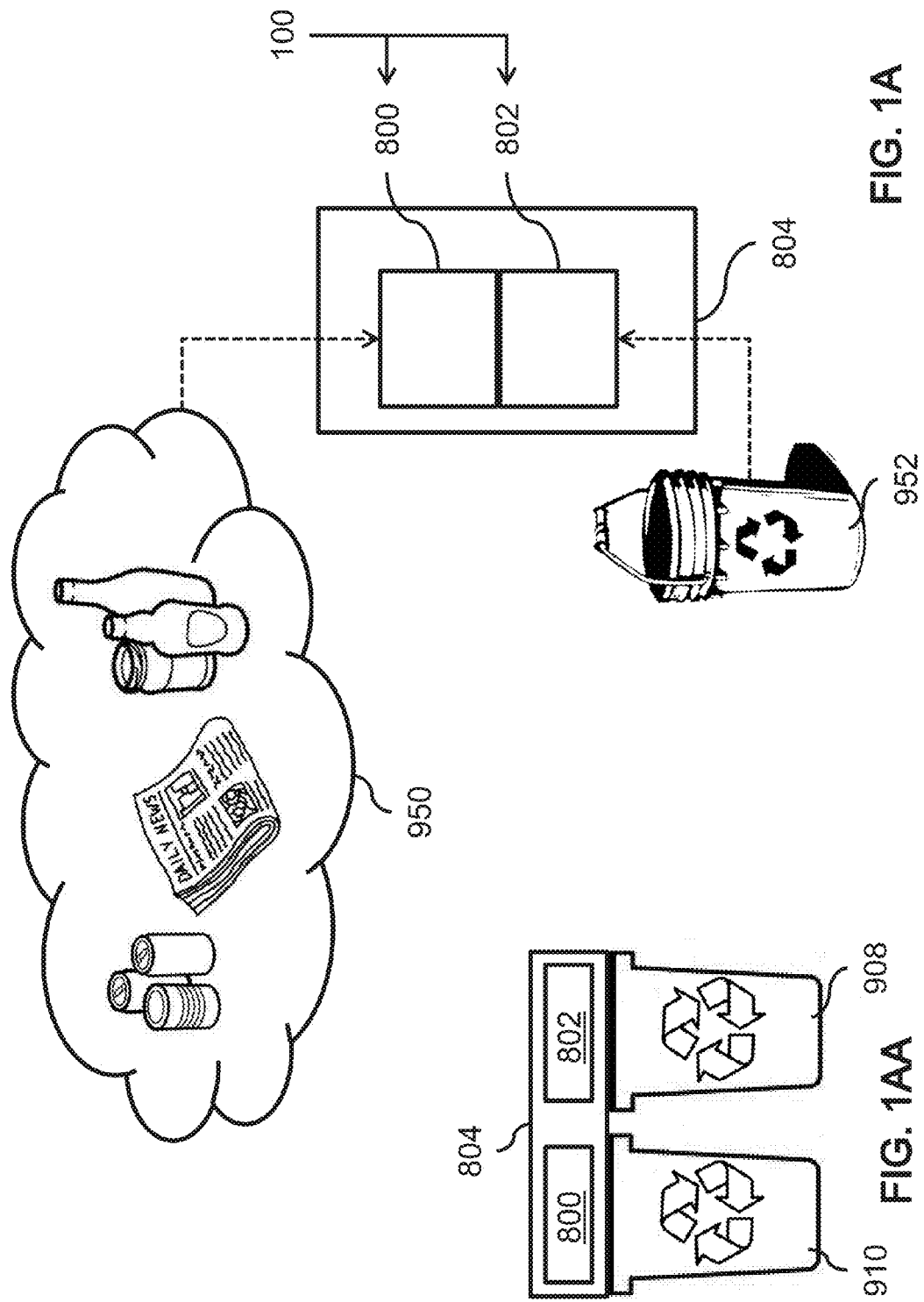

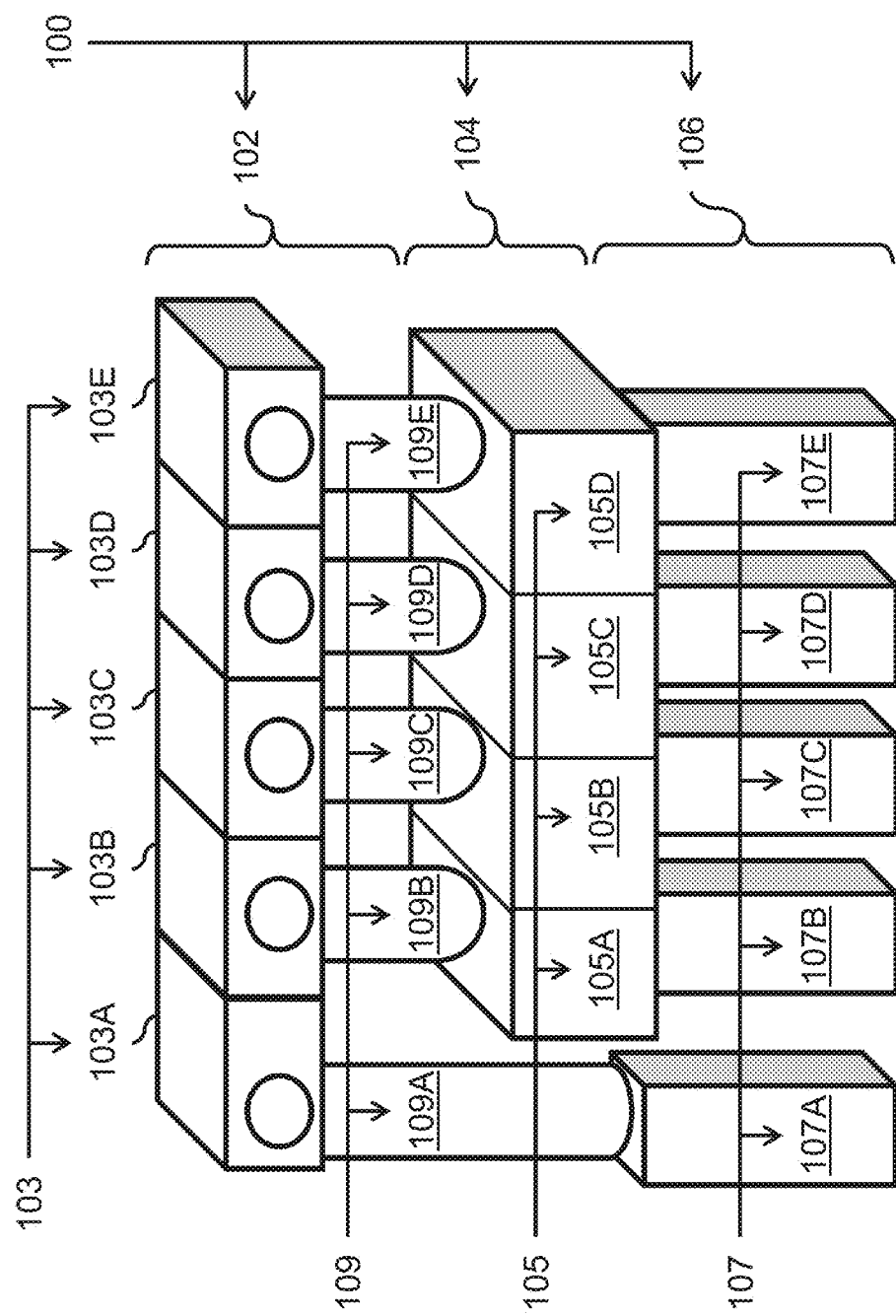

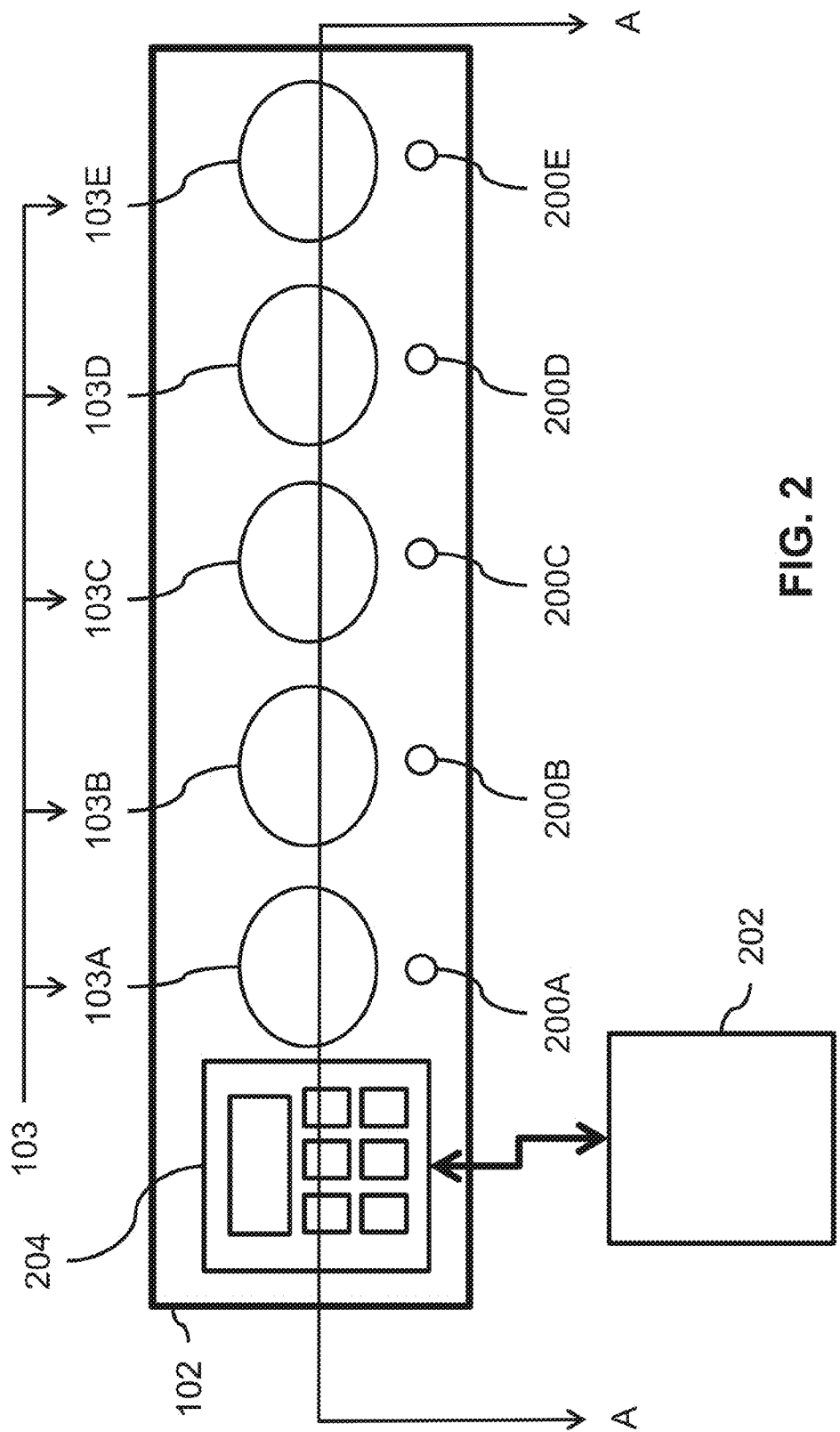

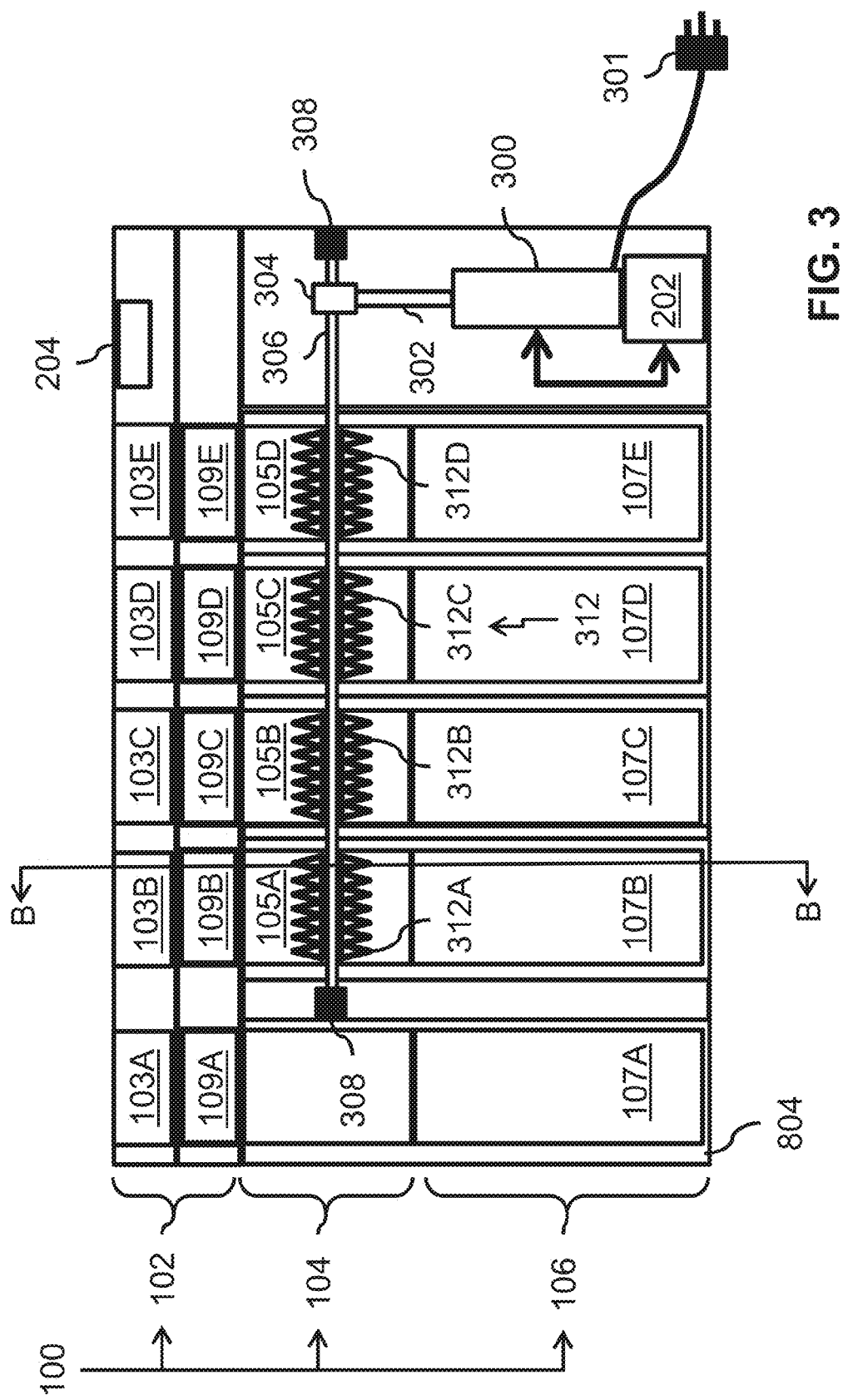

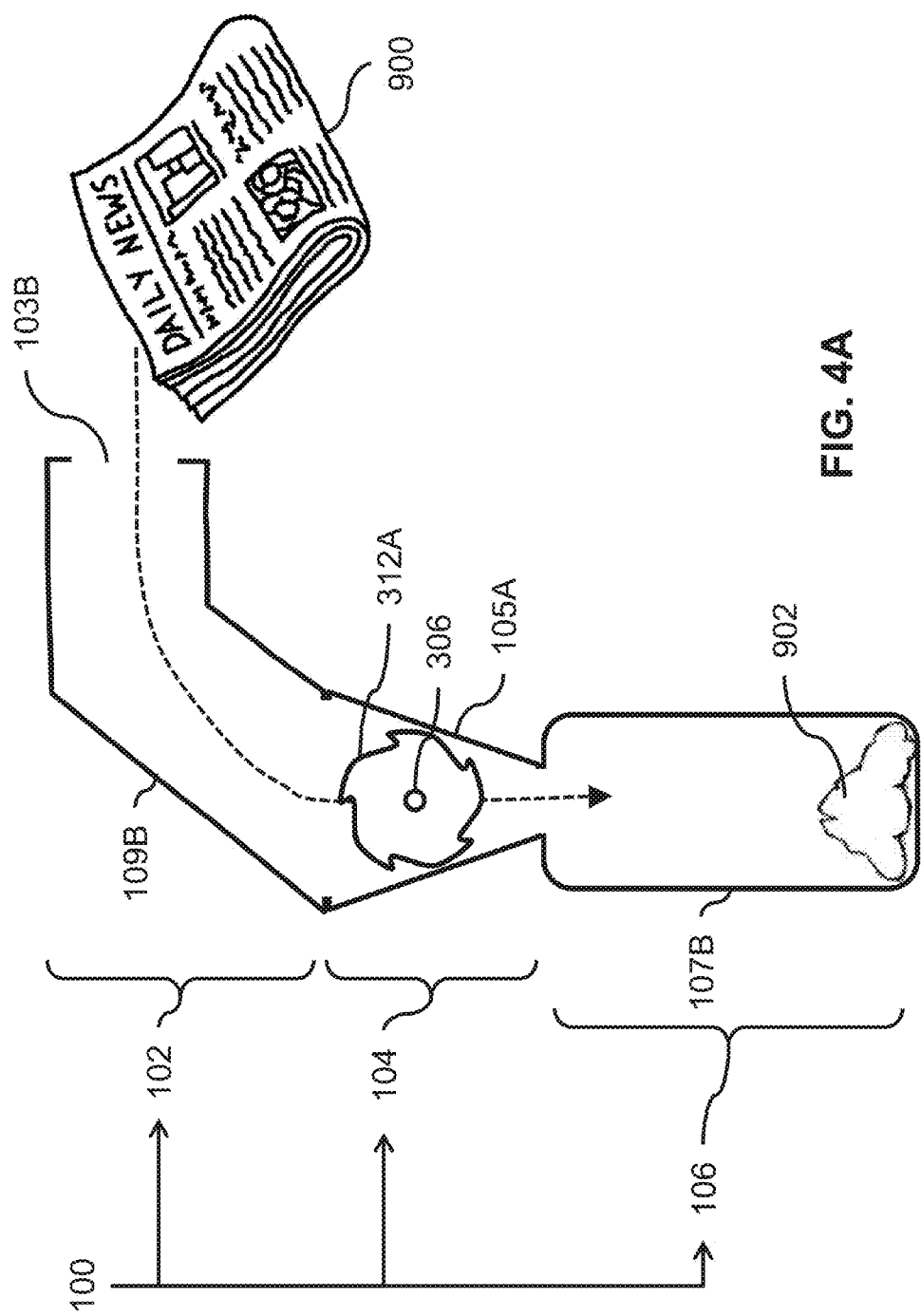

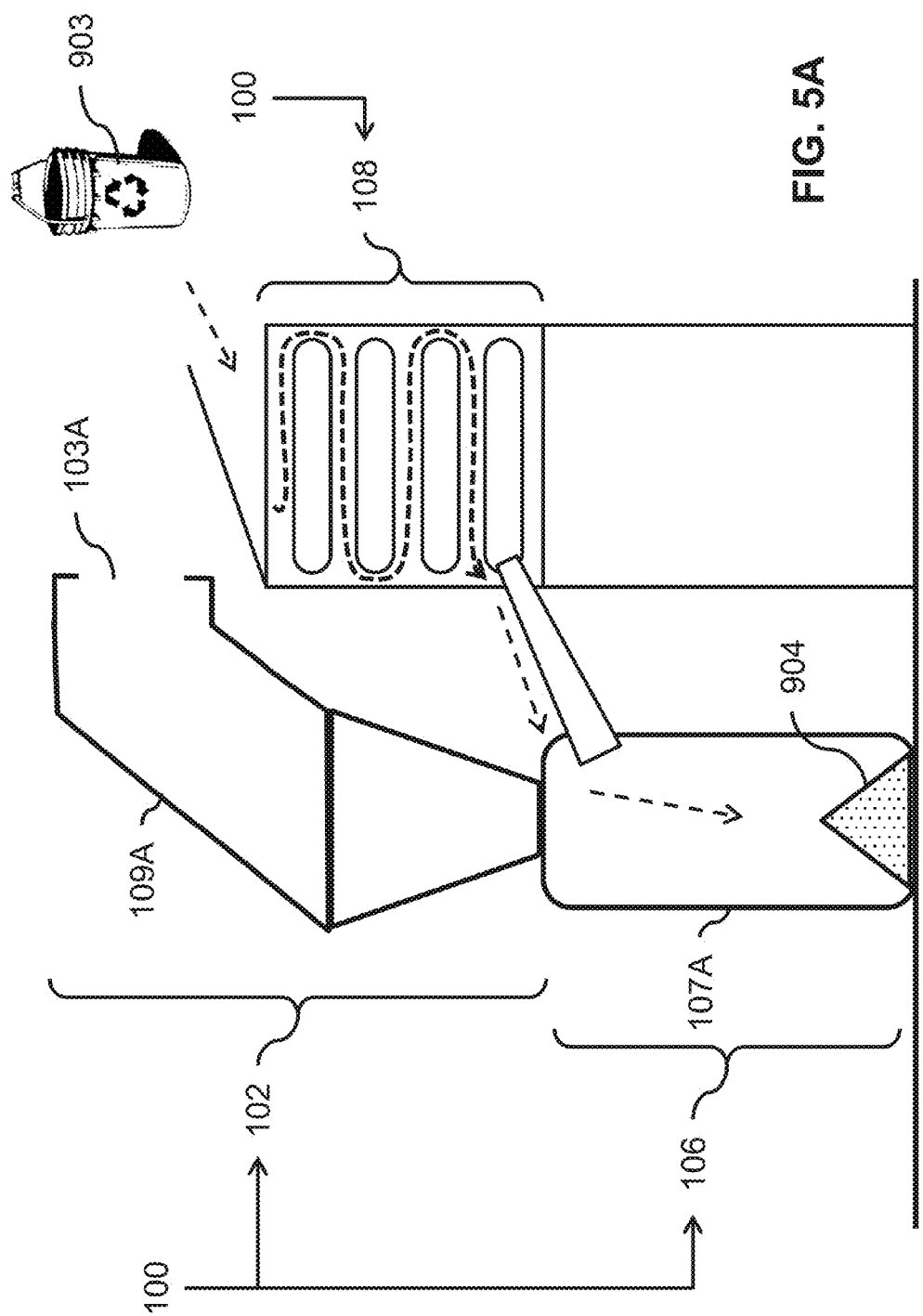

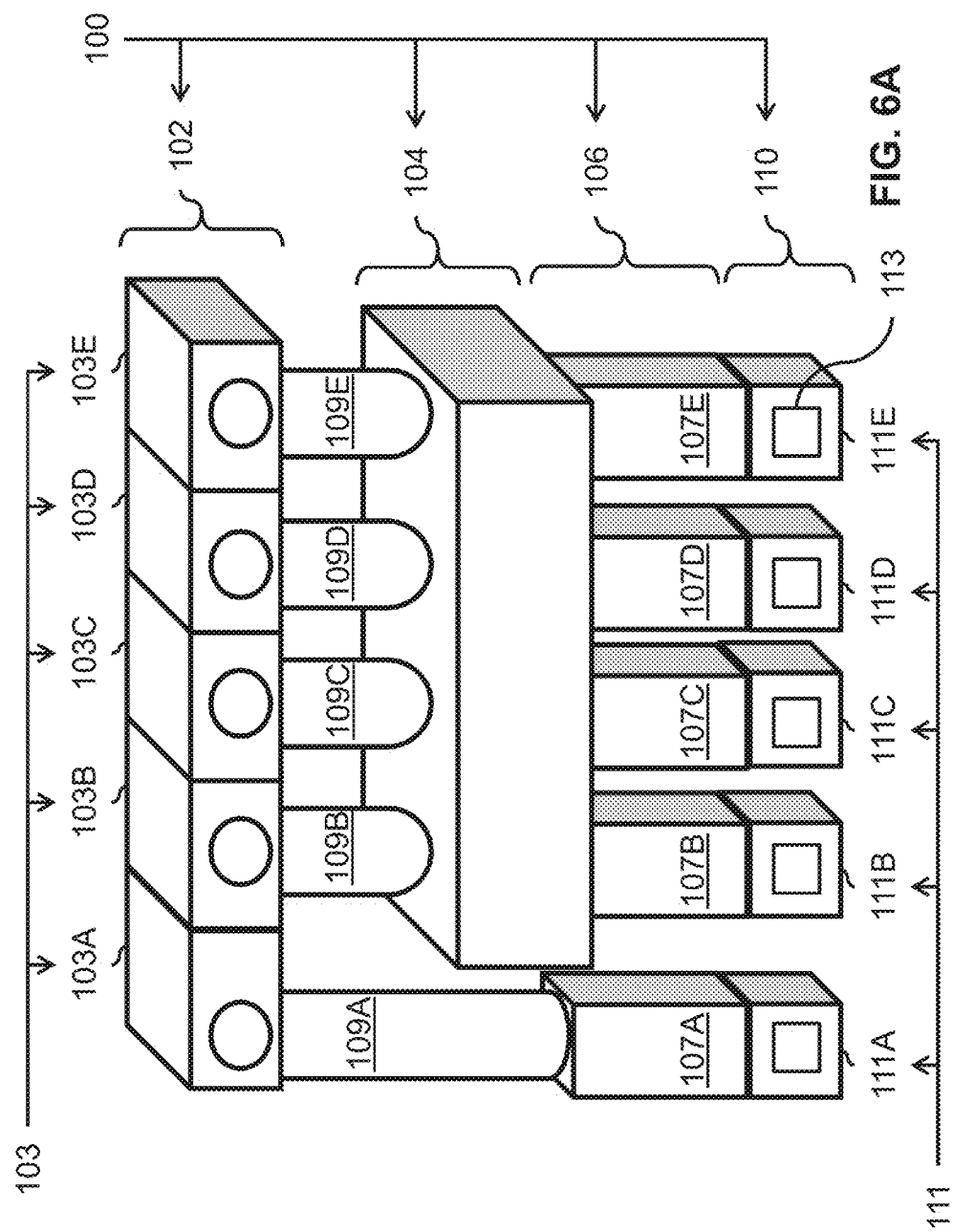

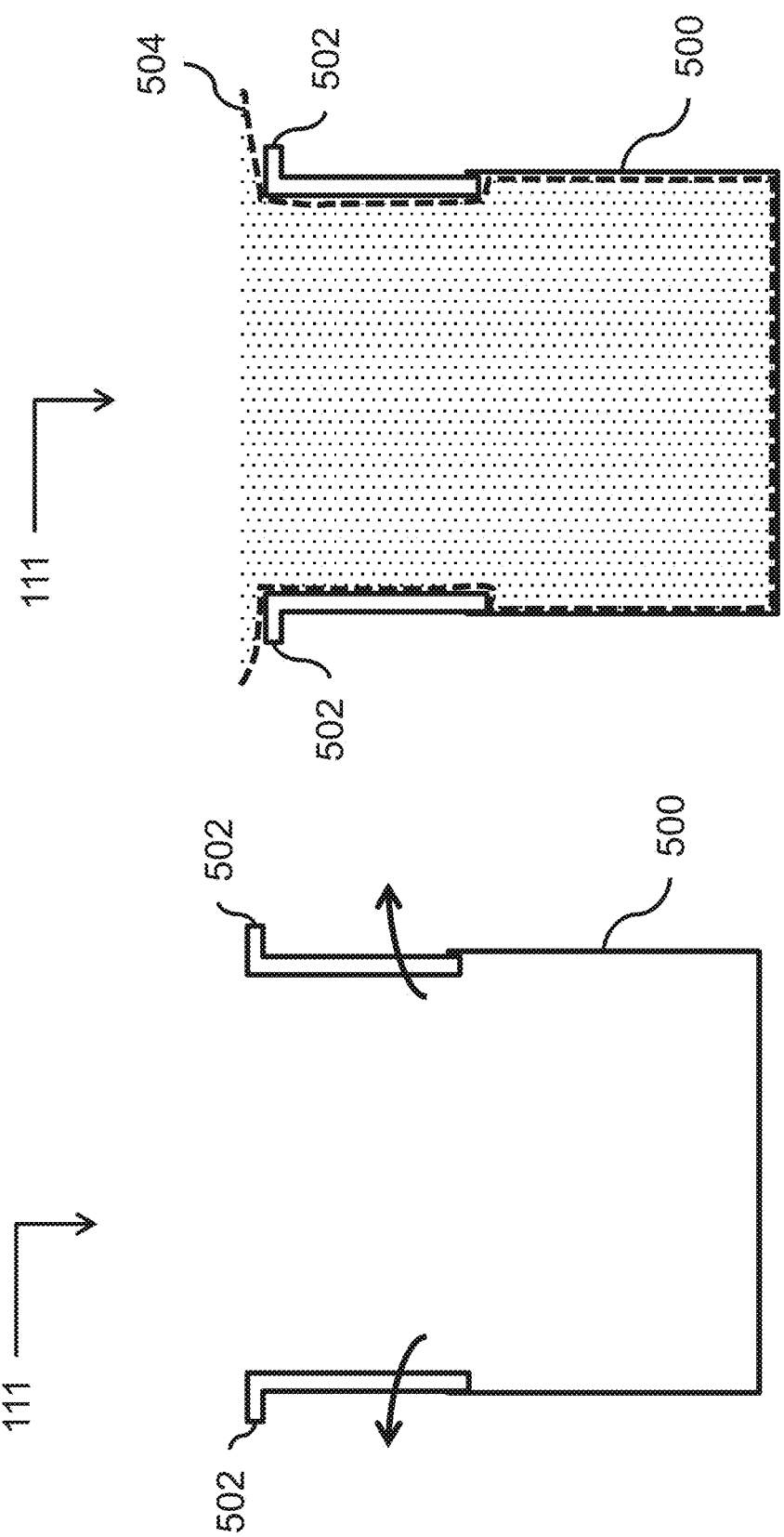

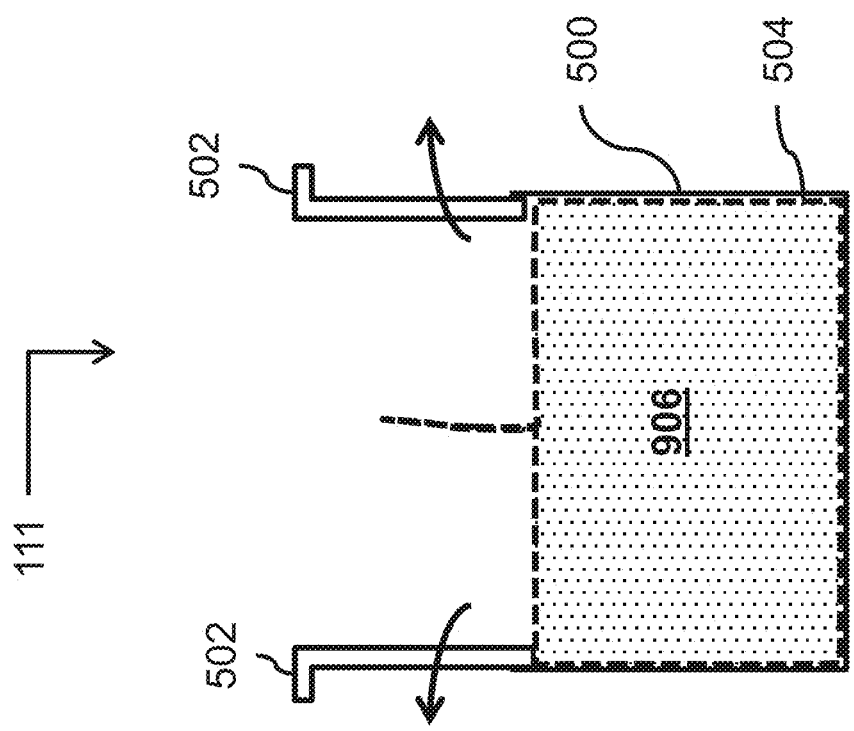

RECYCLING APPLIANCE

TECHNICAL FIELD

This document relates to the technical field of (and is not limited to) a recycling appliance (also called a domestic recycling appliance or a household recycling appliance) for use at home and/or at a place of work, etc.

BACKGROUND

Managing waste represents a challenge. In most of the world, including North America, the consumer does one of two things with ordinary garbage: burn it or bury it. Neither one is a good option for the environment. Burning garbage in incinerators releases dangerous gases and dust (particulate matter) that contribute to global warming and releases environmental pollutants (toxins) into lakes, forests, oceans and cities located half a world away from their source of origin. Most incinerators in industrialized countries remove large quantities of particles and pollutants, thus ensuring somewhat cleaner air. But the bulk of what these systems remove ends up in a landfill. Landfills do not represent an environmentally friendly solution for numerous reasons. Landfills are the source of toxins, leachate and greenhouse gases. Burying garbage also causes both air and water pollution, and simply transporting garbage to the landfills consumes an increasing amount of fossil fuels that produce more pollution and other problems.

SUMMARY

It will be appreciated that there exists a need to mitigate (at least in part) at least one problem associated with existing recycling appliances. After much study of the known systems and methods with experimentation, an understanding of the problem and its solution has been identified and is articulated as follows:

To mitigate, at least in part, at least one problem associated with existing recycling appliances, there is provided (in accordance with a major aspect) a domestic recycling appliance. The domestic recycling appliance is for processing non-organic recyclable materials and organic materials. The domestic recycling appliance includes a non-organic processing assembly configured to receive, process and store the non-organic recyclable materials. An organic processing assembly is spaced apart from the non-organic processing assembly. The organic processing assembly is configured to receive, process and store the organic materials. A common housing assembly is configured to house the non-organic processing assembly and the organic processing assembly.

To mitigate, at least in part, at least one problem associated with existing recycling appliances, there is provided (in accordance with a major aspect) a domestic recycling appliance. The domestic recycling appliance is for processing non-organic recyclable materials and organic materials. The domestic recycling appliance includes an input section configured to receive the non-organic recyclable materials. A shredder section is in communication with the input section. The shredder section is configured to receive and shred the non-organic recyclable materials received from the input section, and generate a shredded recyclable material. An output section is in communication with the shredder section in such a way that the output section receives the shredded recyclable material from the shredder section. An organic-material input module is configured to receive the organic materials. A dedicated organic-material output module is in communication with the organic-material input module in such a way that the dedicated organic-material output module receives the organic materials from the organic-material input module. A common housing assembly is configured to house the input section, the shredder section, the output section, the organic-material input module, and the dedicated organic-material output module.

To mitigate, at least in part, at least one problem associated with existing recycling appliances, there is provided (in accordance with a major aspect) a domestic recycling appliance. The domestic recycling appliance includes an input section having dedicated input modules each configured to receive a predetermined recyclable material. A shredder section has dedicated shredder modules that are in communication with a respective dedicated input module of the input section (this is done in such a way that the dedicated shredder modules each receives and shreds the predetermined recyclable material received from the respective dedicated input module, and generates a predetermined shredded recyclable material). An output section has dedicated output modules that are in communication with a respective dedicated shredder module of the shredder section (this is done in such a way that the dedicated output modules each receives the predetermined shredded recyclable material from the respective dedicated shredder module). A common housing assembly is configured to house the input section, the shredder section and the output section.

Other aspects are identified in the claims.

Other aspects and features of the non-limiting embodiments may now become apparent to those skilled in the art upon review of the following detailed description of the non-limiting embodiments with the accompanying drawings.

DETAILED DESCRIPTION OF THE DRAWINGS

The non-limiting embodiments may be more fully appreciated by reference to the following detailed description of the non-limiting embodiments when taken in conjunction with the accompanying drawings, in which:

FIGS. 1A and 1AA (SHEET 1 of 13 SHEETS) depict schematic views of embodiments of a recycling appliance for processing non-organic recyclable materials and organic materials;

FIG. 1C (SHEET 3 of 13 SHEETS) depicts a perspective view of an embodiment of the recycling appliance of FIG. 1A, in which the recycling appliance includes an input section, a shredder section and an output section;

FIG. 2 (SHEET 4 of 13 SHEETS) depicts a top view of an embodiment of the input section of the recycling appliance of FIG. 1C;

FIG. 3 (SHEET 5 of 13 SHEETS) depicts a cross-sectional view taken through a cross-sectional line A-A of the recycling appliance of FIG. 2;

FIGS. 4A and 4B (SHEETS 6 and 7 of 13 SHEETS) depict cross-sectional views of embodiments of the shredder section and the output section of the recycling appliance of FIG. 3;

FIGS. 5A and 5B (SHEETS 8 and 9 of 13 SHEETS) depict a cross-sectional view and a side view (respectively) of embodiments of an organic waste-treatment unit of the recycling appliance of FIG. 3;

FIGS. 6A, 6B, 6C, 6D, 6E and 6F (SHEETS 10 to 13 of 13 SHEETS) depict schematic views of embodiments of a compactor section of the recycling appliance of any one of FIG. 1C and FIG. 5A; and FIG. 6G (SHEET 13 of 13 SHEETS) depicts a side view of an embodiment of a packaged unit of recycled waste.

Figure 1B:
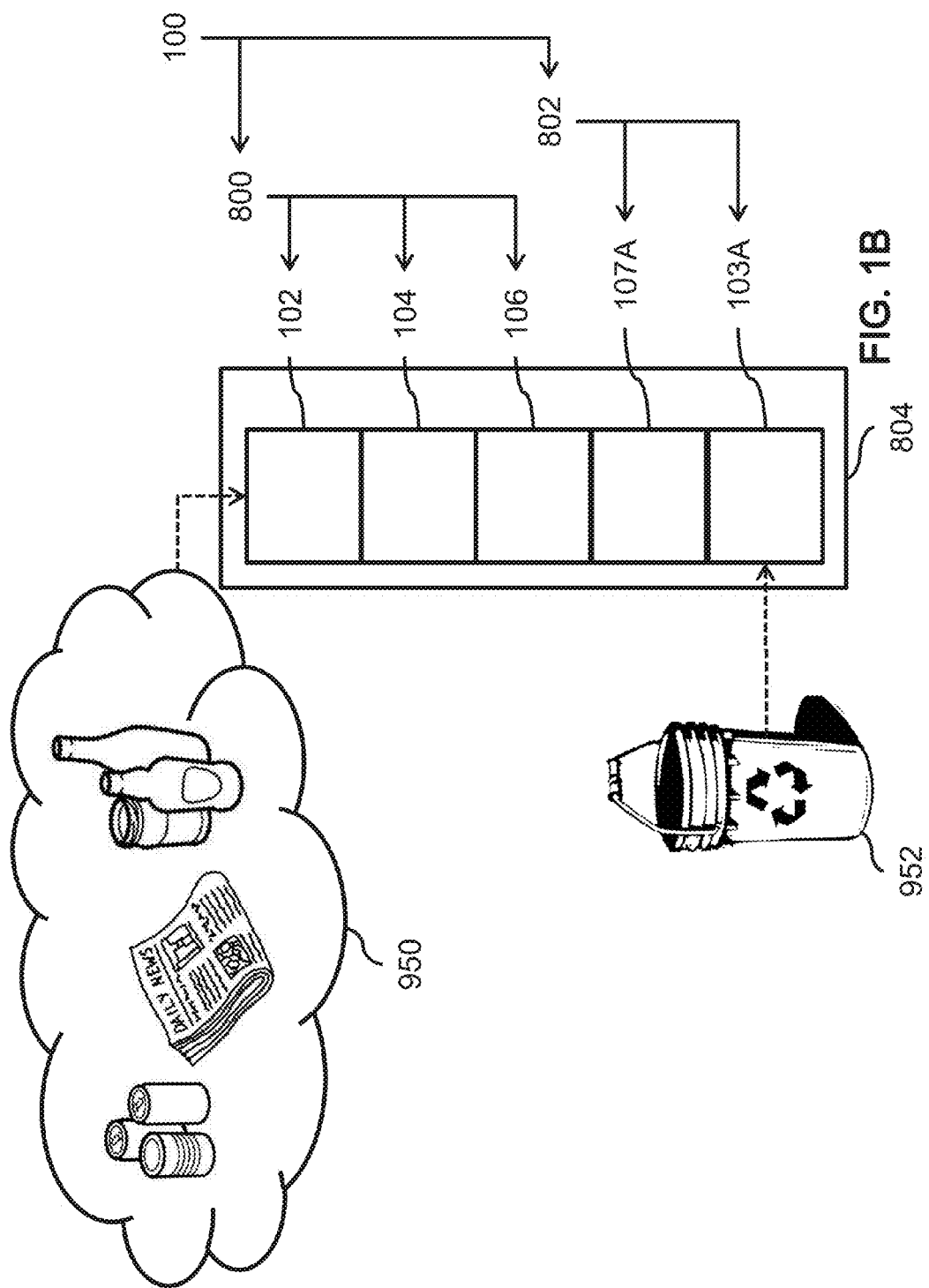
FIG. 1B (SHEET 2 of 13 SHEETS) depicts a perspective view of an embodiment of the recycling appliance of FIG. 1B.

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted.

Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, but well-understood, elements that are useful or necessary in commercially feasible embodiments are often not depicted to provide a less obstructed view of the embodiments of the present disclosure.

LISTING OF REFERENCE NUMERALS USED IN THE DRAWINGS 100 domestic recycling unit
102 input section
103A organic-material input module
103B paper-material input module
103C metal-material input module
103D plastic-material input module
103E glass-material input module
103 dedicated input modules
104 shredder section
105 dedicated shredder modules
105A dedicated paper-material shredder module
105B dedicated metal-material shredder module
105C dedicated plastic-material shredder module
105D dedicated glass-material shredder module
106 output section
107 dedicated output modules
107A dedicated organic-material output module
107B dedicated paper-material output module
107C dedicated metal-material output module
107D dedicated plastic-material output module
107E dedicated glass-material output module
108 organic waste-treatment unit
109 dedicated chute modules
109A dedicated organic-material chute module
109B dedicated paper-material chute module
109C dedicated metal-material chute module
109D dedicated plastic-material chute module
109E dedicated glass-material chute module
110 compactor section
111 dedicated compactor modules
111A dedicated organic-material compactor module
111B dedicated paper-material compactor module
111C dedicated metal-material compactor module
111D dedicated plastic-material compactor module
111E dedicated glass-material compactor module
113 compactor outlet
200A dedicated organic-material power button
200B dedicated paper-material power button
200C dedicated metal-material power button
200D dedicated plastic-material power button
200E dedicated glass-material power button
202 control circuit
204 user control panel
300 motor assembly
301 power cord
302 motor drive-shaft assembly
304 gear-box assembly
306A shafts
306 drivable rotatable shaft
308 bearing support
312A paper-material shredder teeth
312B metal-material shredder teeth
312C plastic-material shredder teeth
312D glass-material shredder teeth
312 shredder teeth
314 shredding blades
400 housing assembly
402 heater assembly
404 input fan unit
405 hot air flow
406A first conveyor belt
406B second conveyor belt
406C third conveyor belt
406D fourth conveyor belt
406 conveyor assembly
407 exhaust fan unit
408 organic-waste inlet
410 organic waste outlet
500 container
502 lid assembly
504 bag
506 push rod
507 compacting force
508 sealing device
800 non-organic processing assembly
802 organic processing assembly
804 housing assembly
900 recyclable object
902 shredded material
903 wet organic waste material
904 processed organic waste
905 non-organic recyclable materials
906 recycled waste
908 organic recycling bin
910 non-organic recycling bin
950 non-organic recyclable materials
952 organic materials
954 vacuum pack device

DETAILED DESCRIPTION OF THE NON-LIMITING EMBODIMENT(S)

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of the invention is defined by the claims. For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described.

FIGS. 1A and 1AA depict schematic views of embodiments of a recycling appliance 100 for processing non-organic recyclable materials 950 and organic materials 952.

In accordance with all of the FIGS., and more specifically, in accordance with the embodiment depicted in FIG. 1A, the recycling appliance 100 is for processing the non-organic recyclable materials 950 (such as, glass, metal cans, plastic bottles and paper products, etc.) and the organic materials 952 (such as food waste and/or pet waste). The recycling appliance 100 includes (and is not limited to) a combination of a non-organic processing assembly 800 and an organic processing assembly 802. The non-organic processing assembly 800 is configured to receive, process and store the non-organic recyclable materials 905. The organic processing assembly 802 is spaced apart from the non-organic processing assembly 800. The organic processing assembly 802 is configured to receive, process and store the organic materials 952. In accordance with a preferred embodiment, the recycling appliance 100 includes a housing assembly 804 configured to house (and contain) the non-organic processing assembly 800 and the organic processing assembly 802.

Referring to the embodiment depicted in FIG. 1AA, the recycling appliance 100 is configured for placement over the top of a set of recycling bins. For instance, an organic recycling bin 908 is for receiving organic waste (from the organic processing assembly 802), and a non-organic recycling bin 910 is for receiving non-organic waste (such as, plastic, paper, cardboard, glass and aluminum) from the non-organic processing assembly 800. In accordance with an embodiment, the recycling appliance 100 provides a single opening for receiving all non-organic recycling material, and processing the materials and placing the shredded materials into a single recycling bin (excluding the organic material). In this manner, the shredded materials compacted to lower the volume in the recycling bin.

The recycling appliance 100 may be located or positioned in the garage of a household where the existing recycling bins are located. For this case, the recycling appliance 100 is installed above the existing recycling bins (to allow quick access to the street for recycling pick-up).

In accordance with a preferred embodiment, once the recycling material are received by the recycling appliance 100, a sensor (known and not depicted) is configured to indicate that the correct recycling material has been received by the recycling appliance 100, and the recycling appliance 100 may then be activated to process (such as, to shred) the recycling materials that were received. By way of example (and not limited there to), a technical effect of the recycling appliance 100 is the capacity to exceed the current recycling material collection method by about five multiples (depending on the size of the recycling bin).

FIG. 1B depicts a perspective view of an embodiment of the recycling appliance 100 of FIG. 1B.

In accordance with the embodiment depicted in FIG. 1B, the recycling appliance 100 (includes and is not limited to) a combination of an input section 102, a shredder section 104, an output section 106, an organic-material input module 103A, and a dedicated organic-material output module 107A. The input section 102 is configured to receive the non-organic recyclable materials 950. The shredder section 104 is in communication with the input section 102. The shredder section 104 is configured to receive and shred the non-organic recyclable materials 950 received from the input section 102, and generate a shredded recyclable material. The output section 106 is in communication with the shredder section 104 in such a way that the output section 106 receives the shredded recyclable material from the shredder section 104. The organic-material input module 103A is configured to receive the organic materials 952. The dedicated organic-material output module 107A is in communication with the organic-material input module 103A (this is done in such a way that the dedicated organic-material output module 107A receives the organic materials 952 from the organic-material input module 103A). In accordance with a preferred embodiment, the recycling appliance 100 includes a housing assembly 804 configured to house (and contain) the input section 102, the shredder section 104, the output section 106, the organic-material input module 103A, and the dedicated organic-material output module 107A.

FIG. 1C depicts a perspective view of an embodiment of the recycling appliance 100 of FIG. 1A, in which the recycling appliance 100 includes an input section 102, a shredder section 104 and an output section 106.

In accordance with the embodiment depicted in FIG. 1C, the recycling appliance 100 includes (and is not limited to) a combination of the input section 102, the shredder section 104 and the output section 106.

The input section 102 has (includes) dedicated input modules 103. Each of the dedicated input modules 103 are configured to receive a predetermined recyclable material (such as, paper, metal, plastic and/or glass).

In accordance with a preferred option, the dedicated input modules 103 include (and are not limited to) an organic-material input module 103A, a paper-material input module 103B spaced apart from the organic-material input module 103A, a metal-material input module 103C spaced apart from the organic-material input module 103A and a plastic-material input module 103D spaced apart from the glass-material input module 103E. It will be appreciated (for preferable embodiments) that any section of the housing assembly 804 is configured to be lifted away from the housing assembly 804 (such as, the metal recycling section, etc.) in such a way that recycling of a material (such a metal object, etc.) is facilitated for relatively larger recyclable objects.

The shredder section 104 has (includes) dedicated shredder modules 105. The dedicated shredder modules 105 are in communication with a respective dedicated input module 103 of the input section 102. This is done in such a way that each of the dedicated shredder modules 105 receives and shreds the predetermined recyclable material received from the respective dedicated input module 103, and generates a predetermined shredded recyclable material (for their respective dedicated input module 103).

In accordance with a preferred embodiment, the dedicated shredder modules 105 include (and are not limited to) a dedicated paper-material shredder module 105A, a dedicated metal-material shredder module 105B, a dedicated plastic-material shredder module 105C, and a dedicated glass-material shredder module 105D. The dedicated metal-material shredder module 105B is spaced apart from the dedicated paper-material shredder module 105A. The dedicated plastic-material shredder module 105C is spaced apart from the dedicated paper-material shredder module 105A. The dedicated glass-material shredder module 105D is spaced apart from the dedicated paper-material shredder module 105A. The dedicated paper-material shredder module 105A is for use with (is for dedicated use with) the paper-material input module 103B. The dedicated metal-material shredder module 105B is for use with (is for dedicated use with) the metal-material input module 103C. The dedicated plastic-material shredder module 105C is for use with (is for dedicated use with) the plastic-material input module 103D. The dedicated glass-material shredder module 105D is for use with (is for dedicated use with) the glass-material input module 103E.

The output section 106 has (includes) dedicated output modules 107. The dedicated output modules 107 are in communication with a respective dedicated shredder module 105 of the shredder section 104. This is done in such a way that each of the dedicated output modules 107 receives the predetermined shredded recyclable material from the respective dedicated shredder module 105.

In accordance with a preferred embodiment, the dedicated output modules 107 include (and are not limited to) a dedicated organic-material output module 107A, a dedicated paper-material output module 107B, a dedicated metal-material output module 107C, a dedicated plastic-material output module 107D, and a dedicated glass-material output module 107E. The dedicated paper-material output module 107B is spaced apart from the dedicated organic-material output module 107A. The dedicated metal-material output module 107C is spaced apart from the dedicated organic-material output module 107A. The dedicated plastic-material output module 107D is spaced apart from the dedicated organic-material output module 107A. The dedicated glass-material output module 107E is spaced apart from the dedicated organic-material output module 107A. The dedicated organic-material output module 107A is for use with (is for dedicated use with) the organic-material input module 103A. The dedicated paper-material output module 107B is for use with (is for dedicated use with) the paper-material input module 103B. The dedicated metal-material output module 107C is for use with (is for dedicated use with) the metal-material input module 103C. The dedicated plastic-material output module 107D is for use with (is for dedicated use with) the plastic-material input module 103D. The dedicated glass-material output module 107E is for use with (is for dedicated use with) the glass-material input module 103E. It will be appreciated that the dedicated organic-material output module 107A may receive organic waste in a biodegradable bag (known and not depicted) placed in the dedicated organic-material output module 107A.

In accordance with a preferred embodiment for the input section 102, the input section 102 includes dedicated chute modules 109. The dedicated chute modules 109 are configured to operatively connect the dedicated input modules 103 of the input section 102 to other sections of the recycling appliance 100.

In accordance with a preferred embodiment, the dedicated chute modules 109 include (and are not limited to) a dedicated organic-material chute module 109A, a dedicated paper-material chute module 109B, a dedicated metal-material chute module 109C, a dedicated plastic-material chute module 109D, and a dedicated glass-material chute module 109E. The dedicated organic-material chute module 109A connects the organic-material input module 103A to the dedicated organic-material output module 107A. The dedicated paper-material chute module 109B connects the paper-material input module 103B to the dedicated paper-material output module 107B. The dedicated metal-material chute module 109C connects the metal-material input module 103C to the dedicated metal-material output module 107C. The dedicated plastic-material chute module 109D connects the plastic-material input module 103D to the dedicated plastic-material output module 107D. The dedicated glass-material chute module 109E connects the glass-material input module 103E to the dedicated glass-material output module 107E.

Some benefits associated with the various embodiments of the recycling appliance 100 may include: (A) by separating the recycling material, a lower processing cost of the recycling material may be achieved, thereby lowering the price of recycled raw materials; and/or (B) by shredding the recycling material, less space (a lower volume) of shredded materials requires fewer pick-ups of recycling materials (at the curbside of a home or business).

It will be appreciated that the recycling appliance 100 may be used at the home and/or at a business.

FIG. 2 depicts a top view of an embodiment of the input section 102 of the recycling appliance 100 of FIG. 1C.

In accordance with the embodiment depicted in FIG. 2, the input section 102 includes a dedicated organic-material power button 200A, a dedicated paper-material power button 200B, a dedicated metal-material power button 200C, a dedicated plastic-material power button 200D, and a dedicated glass-material power button 200E. The dedicated organic-material power button 200A is for the organic-material input module 103A (with the embodiment depicted in FIG. 5A). The dedicated paper-material power button 200B is for the paper-material input module 103B. The dedicated metal-material power button 200C is for the metal-material input module 103C. The dedicated plastic-material power button 200D is for the plastic-material input module 103D. The dedicated glass-material power button 200E is for the glass-material input module 103E.

The dedicated organic-material power button 200A is configured to initiate operations associated with the organic-material input module 103A. The dedicated organic-material power button 200A may include a lamp annunciator configured to provide a visual user indication that the systems associated with the organic-material input module 103A are actively operating.

The dedicated paper-material power button 200B is configured to initiate operations associated with the paper-material input module 103B. The dedicated paper-material power button 200B may include a lamp annunciator configured to provide a visual user indication that the systems associated with the paper-material input module 103B are actively operating.

The dedicated metal-material power button 200C is configured to initiate operations associated with the metal-material input module 103C. The dedicated metal-material power button 200C may include a lamp annunciator configured to provide a visual user indication that the systems associated with the metal-material input module 103C are actively operating.

The dedicated plastic-material power button 200D is configured to initiate operations associated with the plastic-material input module 103D. The dedicated plastic-material power button 200D may include a lamp annunciator configured to provide a visual user indication that the systems associated with the plastic-material input module 103D are actively operating.

The dedicated glass-material power button 200E is configured to initiate operations associated with the glass-material input module 103E. The dedicated glass-material power button 200E may include a lamp annunciator configured to provide a visual user indication that the systems associated with the glass-material input module 103E are actively operating.

In accordance with a preferred embodiment, the input section 102 includes a control circuit 202. The control circuit 202 is configured to control operations of the powered assemblies (systems) of the recycling appliance 100. The input section 102 also includes a user control panel 204 that is operatively connected to the control circuit 202. The user control panel 204 includes a keypad and a display unit. The user control panel 204 is configured to assist the user in controlled operation of the powered assemblies (systems, etc.) of the recycling appliance 100.

FIG. 3 depicts a cross-sectional view taken through a cross-sectional line A-A of the recycling appliance 100 of FIG. 2.

In accordance with the embodiment depicted in FIG. 3, the shredder section 104 includes a motor assembly 300, a power cord 301, a motor drive-shaft assembly 302, a gear-box assembly 304, a drivable rotatable shaft 306, a bearing support 308 and a housing assembly 804. The housing assembly 804 is configured to house the motor assembly 300. The motor assembly 300 is fixedly mounted to an interior section of the housing assembly 804. The motor assembly 300 is positioned in a vertical alignment within the housing assembly 804. The power cord 301 extends from the motor assembly 300. The power cord 301 is configured to supply electric power to the motor assembly 300 (to drive the motor assembly 300). The motor drive-shaft assembly 302 extends (upwardly) from the motor assembly 300. The motor drive-shaft assembly 302 is operatively coupled to the gear-box assembly 304. The gear-box assembly 304 is fixedly mounted to the housing assembly 804. The drivable rotatable shaft 306 is operatively coupled to the gear-box assembly 304 (this is done in such a way that in response to rotation of the motor drive-shaft assembly 302 of the motor assembly 300, the drivable rotatable shaft 306 is rotated). The drivable rotatable shaft 306 is rotatably supported by the bearing support 308. The drivable rotatable shaft 306 may be called a common shaft. The drivable rotatable shaft 306 extends through and along a length of the shredder section 104 between the dedicated shredder modules 105. The bearing support 308 is positioned on opposite sides of the housing assembly 804 (to the opposite lateral side walls of the housing assembly 804). The shredder teeth of each of the dedicated shredder modules 105 are operatively mounted to the drivable rotatable shaft 306 (this is done in such a way that once the drivable rotatable shaft 306 is rotated, the shredder teeth are rotated to shred recyclable materials). The materials that are shredded in each of the dedicated shredder modules 105.

In accordance with a preferred embodiment, the control circuit 202 is configured to: (A) recognize (with or without sensors) the recyclable materials placed in the input section 102; and (B) execute (operate or run) different recycling-processing programs for different materials (that are placed into the input section 102) in terms of the speed of the shredder knives (also called shredder teeth) needed to successfully shred material and to separate the shredded materials into the different compartments (located in the output section 106).

In accordance with a preferred embodiment, paper-material shredder teeth 312A are operatively mounted in the dedicated paper-material shredder module 105A. Metal-material shredder teeth 312B are operatively mounted in the dedicated metal-material shredder module 105B. Plastic-material shredder teeth 312C are operatively mounted in the dedicated plastic-material shredder module 105C. Glass-material shredder teeth 312D are operatively mounted in the dedicated glass-material shredder module 105D. It will be appreciated that each dedicated shredder module 105 (such as dedicated paper-material shredder module 105A, dedicated metal-material shredder module 105B, dedicated plastic-material shredder module 105C, dedicated glass-material shredder module 105D) may differ in structure and/or arrangement (as may be required) depending on the type of recycling material to be processed (shredded), such as whether the recycling material includes any one of glass, aluminum, plastic, paper/cardboard, etc.

In accordance with an embodiment, there are dedicated openings (openings dedicated for receiving glass, metal, aluminum, paper and plastic, etc.) with associated dedicated compartments. In accordance with an embodiment, the recycling appliance 100 includes an organic waste decomposing unit (known and not depicted).

Figure 4B:
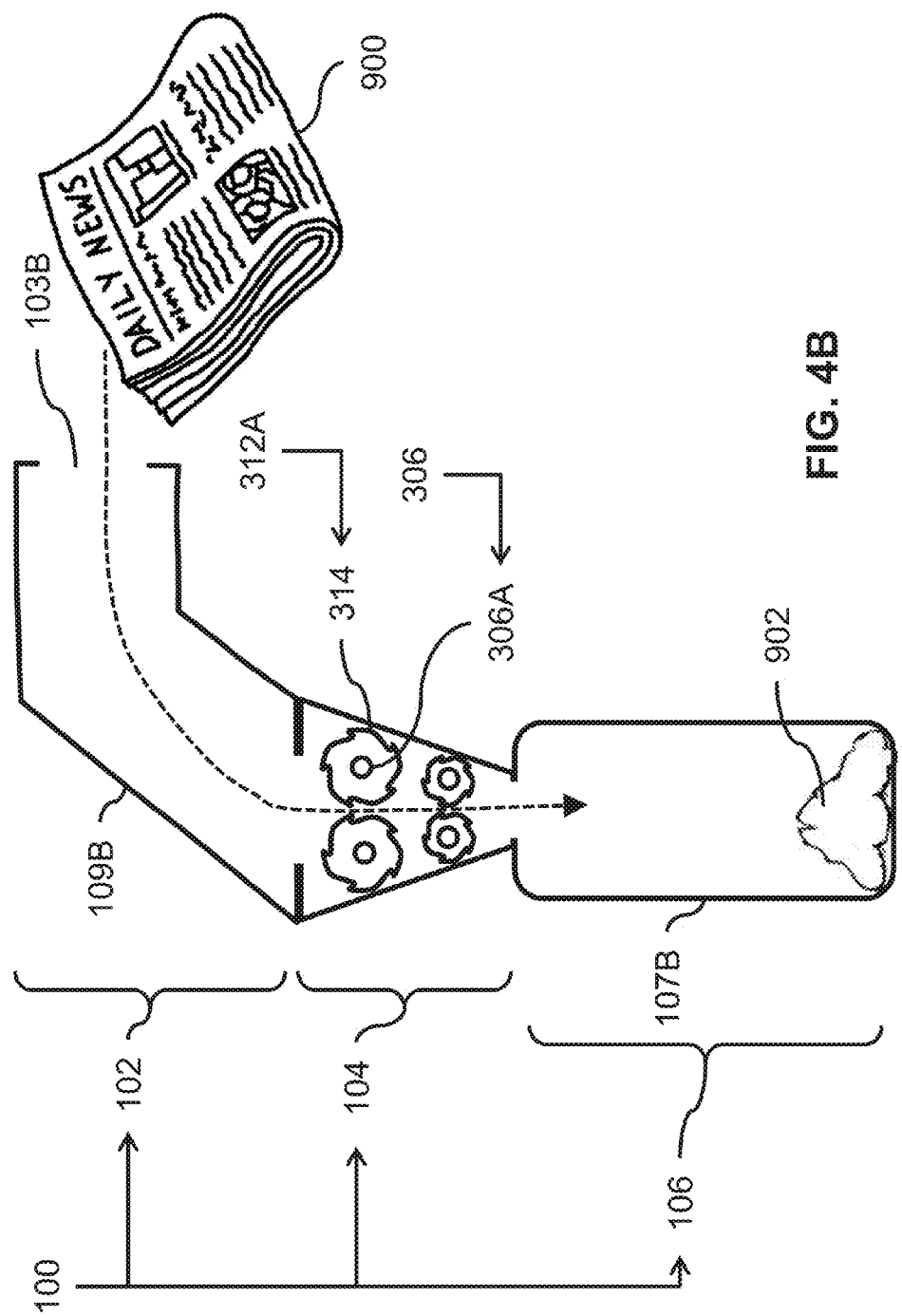

FIGS. 4A and 4B depict cross-sectional views taken through a cross-sectional line B-B of embodiments of the shredder section 104 and the output section 106 of the recycling appliance 100 of FIG. 3.

In accordance with the embodiment depicted in FIG. 4A, a recyclable object 900 (paper) is to be shredded by the dedicated paper-material shredder module 105A. The recyclable object 900 is inserted into the input section 102 via the paper-material input module 103B, and the recyclable object 900 travels through the dedicated paper-material chute module 109B toward the dedicated metal-material shredder module 105B of the shredder section 104. The shredder teeth 312 include at least one or more discs each having a peripherally disposed serrated cutting edge. The discs are operatively mounted to the drivable rotatable shaft 306. The metal-material shredder teeth 312B are configured to shred the recyclable object 900 into relatively smaller pieces (in response to rotation of the drivable rotatable shaft 306). The output (shredded material 902) of the dedicated metal-material shredder module 105B then travels (moves) to the dedicated paper-material output module 107B of the output section 106 (via gravity feed). The shredded material 902 is formed by the recycling appliance 100 in connection with processing of the recyclable object 900.

In accordance with the embodiment depicted in FIG. 4B, the paper-material shredder teeth 312A includes a set of shredding blades 314 (a set of four blades) that are spaced apart from each other. The drivable rotatable shaft 306 includes a set of shafts 306A that operatively rotate the set of shredding blades 314. The shredder teeth (also called shredding knives) are configured to be strong enough to shred material with the application of a sufficient amount of torque power to the shredder teeth (shredder discs). In accordance with an embodiment, the width between each of the shredding blades 314 is controllable (adjustable), if so desired, so that different materials may be accommodated (for shredding purposes). For instance, the first row (top row) of shredding blades 314 may be spaced apart further than the second row (bottom row) of shredding blades 314 (in order to shred material more thoroughly so that a relatively smaller volume of recyclable material is created).

Figure 5B:
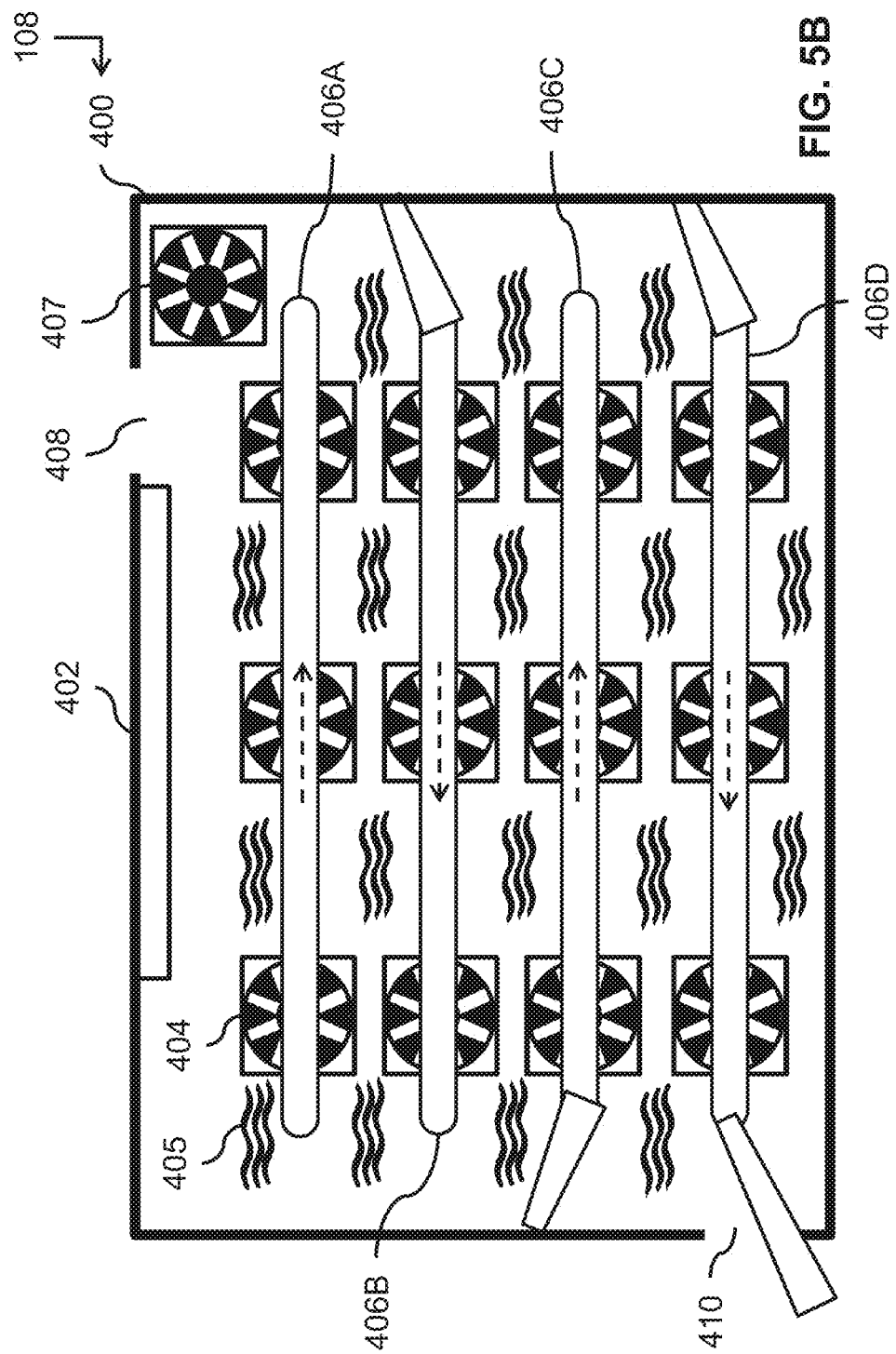

FIGS. 5A and 5B depict a cross-sectional view and a side view (respectively) taken through the cross-sectional line B-B of embodiments of an organic waste-treatment unit 108 of the recycling appliance 100 of FIG. 3.

In accordance with the embodiment depicted in FIG. 5A, the recycling appliance 100 further includes the organic waste-treatment unit 108. The organic waste-treatment unit 108 is configured to dehydrate the organic waste received from the organic-material input module 103A. The organic waste-treatment unit 108 is configured to: (A) receive wet organic waste material 903 (also called biodegradable organic waste); and (B) convert the wet organic waste material 903 (that was received) into a processed organic waste 904. It will be appreciated (for preferable embodiments) that the organic waste-treatment unit 108 is configured to facilitate internal periodic cleaning of the interior of the organic waste-treatment unit 108.

In accordance with the embodiment depicted in FIG. 5B, the organic waste-treatment unit 108 includes a housing assembly 400, a heater assembly 402 (such as a heat lamp, etc.), an input fan unit 404, an exhaust fan unit 407, and a conveyor assembly 406. The heater assembly 402 (such as a heat lamp) is operatively (fixedly) mounted to the housing assembly 400 (preferably to a top section of the housing assembly 400). The heater assembly 402 is configured to generate and radiate heat into the interior of the housing assembly 400. The heat provided by the heater assembly 402 is of the amount needed to extract excess moisture (water) from the wet organic waste material 903 as the wet organic waste material 903 passes through the housing assembly 400. The conveyor assembly 406 is configured to transport the wet organic waste material 903 through and along the housing assembly 400. The input fan unit 404 is operatively mounted to the housing assembly 400 (preferably to the side wall section of the housing assembly 400). The input fan unit 404 is configured to move air through the housing assembly 400 in such a way as to set up a hot air flow 405 as a result of the movement of air within the housing assembly 400. The exhaust fan unit 407 is operatively mounted to a side wall of the housing assembly 400. The exhaust fan unit 407 is configured to exhaust warm air from the interior of the housing assembly 400 (for the case where the internal temperature of the housing assembly 400 becomes too hot). The conveyor assembly 406 is configured to receive the wet organic waste material 903, and to convey the wet organic waste material 903 through the housing assembly 400 (along a circuitous route). In accordance with a preferred embodiment, the conveyor assembly 406 includes a first conveyor belt 406A, a second conveyor belt 406B, a third conveyor belt 406C, and a fourth conveyor belt 406D. The first conveyor belt 406A, the second conveyor belt 406B, the third conveyor belt 406C, and the fourth conveyor belt 406D are stacked one over the other along a vertical direction. The second conveyor belt 406B is spaced apart from the first conveyor belt 406A. The third conveyor belt 406C is spaced apart from the first conveyor belt 406A. The fourth conveyor belt 406D is spaced apart from the first conveyor belt 406A. The housing assembly 400 defines an organic-waste inlet 408 configured to receive the wet organic waste material 903. The housing assembly 400 defines an organic waste outlet 410 configured to output the processed organic waste 904. In accordance with an embodiment, the conveyor assembly 406 includes an endless stainless steel cleated plastic modular belt conveyor (compatible for food processing).

In accordance with the embodiment depicted in FIG. 5B, the housing assembly 400 includes different types of dehydrators for different types of organic waste. Some dehydrators include heat provided by heat lamps, and some dehydrators include warm air provided by fans or the combination of two heating sources. The purpose of the housing assembly 400 is to handle or process organic waste by dehydrating the organic waste. This arrangement results in several benefits (such as, the reduction of odors, the extension of time for pick-up of recycling materials from the curbside, etc.). Also, once the organic waste is made reasonably dry (into dry compost), the dry compost may be wetted again and mixed with dirt in the home garden (to improve the soil).

The housing assembly 400 is configured to dehydrate the organic waste (so that the organic waste can be better managed). Dehydrated organic waste has significantly fewer or no pathogenic micro-organisms and thereby facilitates extended or prolonged time for the pick-up of organic waste (such as, food waste, kitchen waste, herb residues, fruit and vegetable waste, leaves, fish, meat, greens, cereals, and/or bones, etc.) at the curbside.

FIGS. 6A to 6F depict schematic views of embodiments of a compactor section 110 of the recycling appliance 100 of any one of FIG. 1C and FIG. 5A.

In accordance with the embodiment depicted in FIG. 6A, the recycling appliance 100 further includes the compactor section 110. The compactor section 110 may be called a compactor and sealer section. The compactor section 110 includes dedicated compactor modules 111 for a respective dedicated output module 107. Each dedicated compactor module 111 has (provides) a compactor outlet 113.

In accordance with a preferred embodiment, the dedicated compactor modules 111 include a dedicated organic-material compactor module 111A, a dedicated paper-material compactor module 111B, a dedicated metal-material compactor module 111C, a dedicated plastic-material compactor module 111D, and a dedicated glass-material compactor module 111E. The dedicated paper-material compactor module 111B is spaced apart from the dedicated organic-material compactor module 111A. The dedicated metal-material compactor module 111C is spaced apart from the dedicated organic-material compactor module 111A. The dedicated plastic-material compactor module 111D is spaced apart from the dedicated organic-material compactor module 111A. The dedicated glass-material compactor module 111E is spaced apart from the dedicated organic-material compactor module 111A. The dedicated organic-material compactor module 111A is for use with (is for dedicated for use with) the dedicated organic-material output module 107A. The dedicated paper-material compactor module 111B is for use with (is for dedicated for use with) the dedicated paper-material output module 107B. The dedicated metal-material compactor module 111C is for use with (is for dedicated for use with) the dedicated metal-material output module 107C. The dedicated plastic-material compactor module 111D is for use with (is for dedicated for use with) the dedicated plastic-material output module 107D. The dedicated glass-material compactor module 111E is for use with (is for dedicated for use with) the dedicated glass-material output module 107E. In accordance with a preferred option, color-coded bags may be deployed in the compactor section 110.

In accordance with the embodiment depicted in FIG. 6B, the dedicated compactor modules 111 include a container 500 and a lid assembly 502 operatively connected to (pivotally attached to) a top section of the container 500. The lid assembly 502 is positioned in an open state.

In accordance with the embodiment depicted in FIG. 6C, a bag 504 is inserted into the interior of the container 500, with the end section of the bag 504 extending past the lid assembly 502.

Figure 6E:
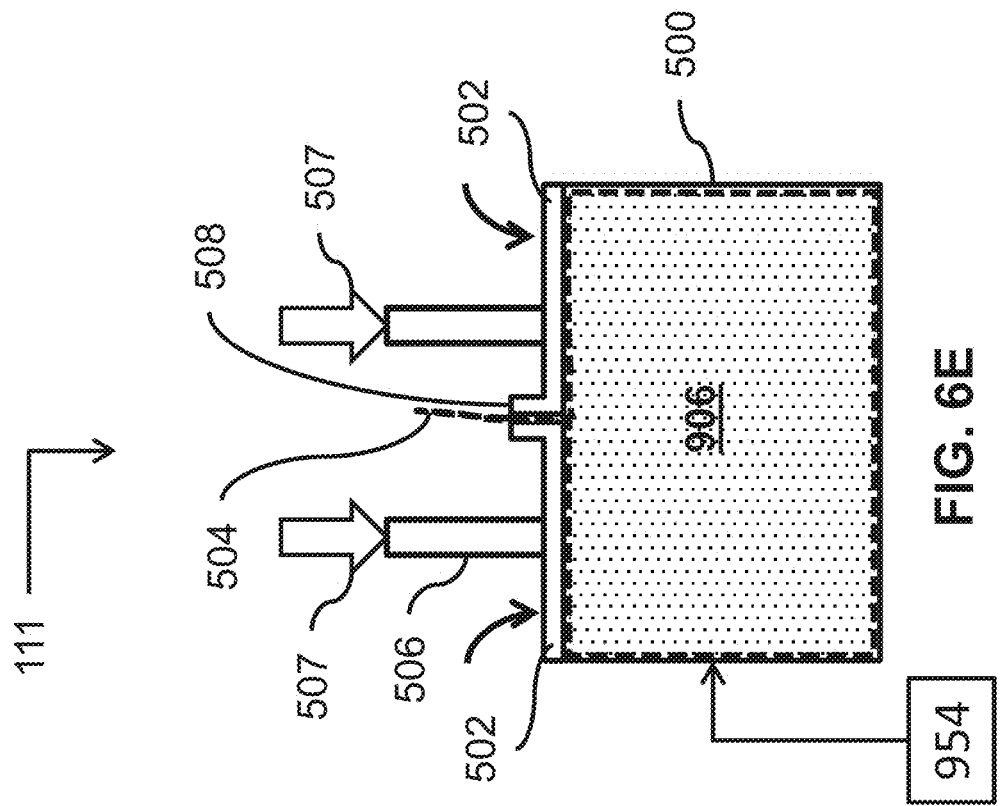
Figure 6D:
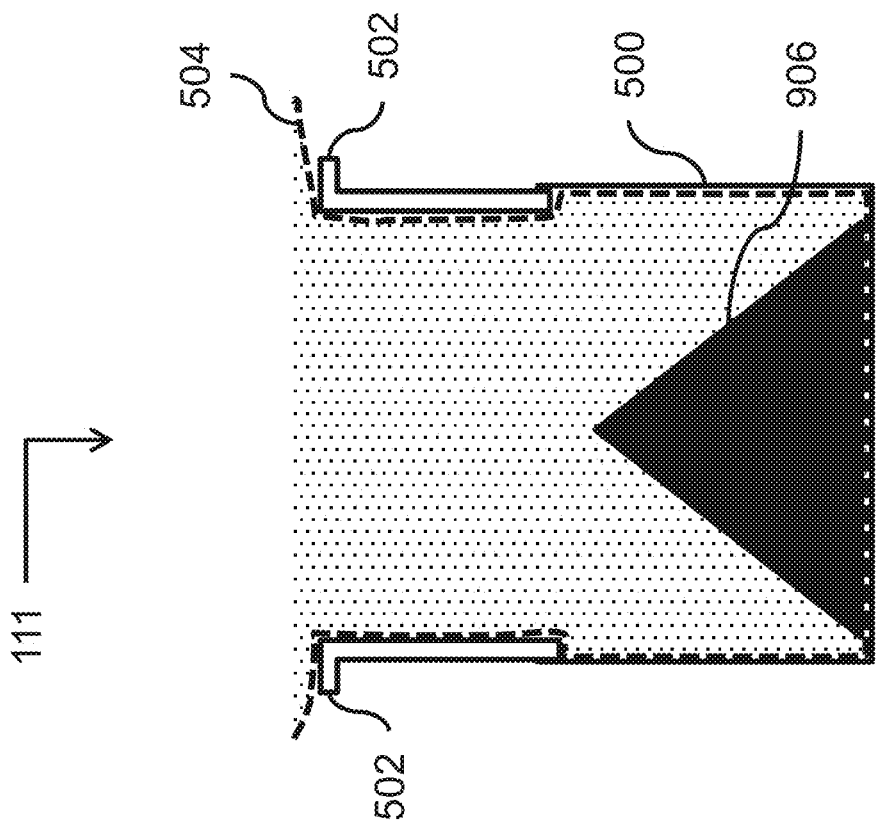

In accordance with the embodiment depicted in FIG. 6D, the recycling appliance 100 is operated in such a way that the bag 504 receives recycled waste 906 from a respective output section 106 (such as, from the dedicated organic-material output module 107A, the dedicated paper-material output module 107B, the dedicated metal-material output module 107C, the dedicated plastic-material output module 107D or the dedicated glass-material output module 107E).

In accordance with the embodiment depicted in FIG. 6E, the dedicated compactor module 111 further includes a push rod 506 and a sealing device 508. Once the bag 504 is filled, the lid assembly 502 is closed (that is, is placed in a closed position in such a way that the lid touches the bag 504). The push rod 506 is configured to be actuated to push against the lid assembly 502 (thereby transmitting a compacting force 507 to the lid assembly 502 to compact the contents of the bag 504 held in the container 500). In accordance with an embodiment, a vacuum pack device 954 is deployed (if so desired) to further reduce the volume of the shredded recyclable material in the bag 504. IN this manner, the bag 504 may be stockpiled (in the garage, etc.) until pick up of the recycled material at the curbside.

In accordance with the embodiment depicted in FIG. 6F, the lid assembly 502 is placed in an open state in such a way that the bag 504 may be removed from the interior of the container 500.

FIG. 6G depicts a side view of an embodiment of a packaged unit of a recycled waste 906 (having a single type of recycled material) provided by (output from) the compactor section 110 of FIG. 6A.

In accordance with the embodiment depicted in FIG. 6G, the bag 504 can be stored in a place (such as, the garage) ready for curbside placement for pick up on the designated recycling pick-up day.

This written description uses examples to disclose the invention, including the best mode, and also to enable any person skilled in the art to make and use the invention. The patentable scope of the invention is defined by the claims, and may include other examples that occur to those skilled in the art. Such other examples are within the scope of the claims if they have structural elements that do not differ from the literal language of the claims, or if they include equivalent structural elements with insubstantial differences from the literal language of the claims.

It may be appreciated that the assemblies and modules described above may be connected with each other as required to perform desired functions and tasks within the scope of persons of skill in the art to make such combinations and permutations without having to describe each and every one in explicit terms. There is no particular assembly or component that may be superior to any of the equivalents available to the person skilled in the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for this document, that the phrase "includes" is equivalent to the word "comprising." The foregoing has outlined the non-limiting embodiments (examples). The description is made for particular non-limiting embodiments (examples). It is understood that the non-limiting embodiments are merely illustrative as examples.

What is claimed is:

1. A recycling appliance for processing non-organic recyclable materials and organic materials, the recycling appliance comprising:
   a non-organic processing assembly being configured to receive, process and store the non-organic recyclable materials;
   an organic processing assembly being spaced apart from the non-organic processing assembly, and the organic processing assembly being configured to receive, process and store the organic materials; and
   a housing assembly being configured to house the non-organic processing assembly and the organic processing assembly; and
   a shredder section being in communication with an input section, and the shredder section being configured to receive and shred the non-organic recyclable materials received from the input section, and generate a shredded recyclable material;
   the organic processing assembly including an organic waste-treatment unit being configured to dehydrate the organic waste received from an organic-material input module; and
   the organic waste-treatment unit being configured to:
      receive wet organic waste material; and
      convert the wet organic waste material that was received into a processed organic waste; and
   wherein the organic waste-treatment unit includes:
      a conveyor assembly, including:
         a first conveyor belt;
         a second conveyor belt;
         a third conveyor belt; and
         a fourth conveyor belt;
   wherein:
      the first conveyor belt, the second conveyor belt, the third conveyor belt, and the fourth conveyor belt are stacked one over the other along a vertical direction;
      the second conveyor belt is spaced apart from the first conveyor belt;
      the third conveyor belt is spaced apart from the first conveyor belt; and
      the fourth conveyor belt is spaced apart from the first conveyor belt.

2. The recycling appliance of claim 1, wherein:
   the non-organic processing assembly includes:
      a paper-material input module spaced apart from the organic-material input module;
      a metal-material input module spaced apart from the organic-material input module;
      a plastic-material input module spaced apart from the organic-material input module; and
      a glass-material input module spaced apart from the organic-material input module; and
      a dedicated paper-material shredder module for the paper-material input module;

a dedicated metal-material shredder module for the metal-material input module;
a dedicated plastic-material shredder module for the plastic-material input module; and
a dedicated glass-material shredder module for the glass-material input module; and
the non-organic processing assembly is in fluid communication with a compactor section.

3. A recycling appliance for processing non-organic recyclable materials and organic materials, the recycling appliance comprising:
an input section being configured to receive the non-organic recyclable materials;
a shredder section being in communication with the input section, and the shredder section being configured to receive and shred the non-organic recyclable materials received from the input section, and generate a shredded recyclable material;
an output section being in communication with the shredder section in such a way that the output section, in use, receives the shredded recyclable material from the shredder section;
an organic-material input module being configured to receive the organic materials;
a dedicated organic-material output module being in communication with the organic-material input module in such a way that the dedicated organic-material output module, in use, receives the organic materials from the organic-material input module; and
a housing assembly being configured to house the input section, the shredder section, the output section, the organic-material input module, and the dedicated organic-material output module; and
the organic-material input module being in fluid communication with an organic processing assembly including an organic waste-treatment unit being configured to dehydrate the organic waste received from the organic-material input module; and
the organic waste-treatment unit being configured to:
receive wet organic waste material; and
convert the wet organic waste material that was received into a processed organic waste; and
wherein the organic waste-treatment unit includes:
a conveyor assembly, including:
a first conveyor belt;
a second conveyor belt;
a third conveyor belt; and
a fourth conveyor belt;
wherein:
the first conveyor belt, the second conveyor belt, the third conveyor belt, and the fourth conveyor belt are stacked one over the other along a vertical direction;
the second conveyor belt is spaced apart from the first conveyor belt;
the third conveyor belt is spaced apart from the first conveyor belt; and
the fourth conveyor belt is spaced apart from the first conveyor belt.

4. The recycling appliance of claim 3, wherein:
the input section includes:
a paper-material input module spaced apart from the organic-material input module;
a metal-material input module spaced apart from the organic-material input module;
a plastic-material input module spaced apart from the organic-material input module; and
a glass-material input module spaced apart from the organic-material input module; and
a dedicated paper-material shredder module for the paper-material input module;
a dedicated metal-material shredder module for the metal-material input module;
a dedicated plastic-material shredder module for the plastic-material input module; and
a dedicated glass-material shredder module for the glass-material input module; and
the output section is in fluid communication with a compactor section.

5. A recycling appliance, comprising:
an input section having dedicated input modules each configured to receive a predetermined recyclable material;
a shredder section having dedicated shredder modules being in communication with a respective dedicated input module of the input section in such a way that the dedicated shredder modules each, in use, receives and shreds the predetermined recyclable material received from the respective dedicated input module, and generates a predetermined shredded recyclable material; and
an output section having dedicated output modules being in communication with a respective dedicated shredder module of the shredder section in such a way that the dedicated output modules each, in use, receives the predetermined shredded recyclable material from the respective dedicated shredder module; and
a housing assembly being configured to house the input section, the shredder section and the output section; and
an organic waste-treatment unit being configured to dehydrate the organic waste received from an organic-material input module; and
the organic waste-treatment unit being configured to:
receive wet organic waste material; and
convert the wet organic waste material that was received into a processed organic waste; and
wherein the organic waste-treatment unit includes:
a conveyor assembly, including:
a first conveyor belt;
a second conveyor belt;
a third conveyor belt; and
a fourth conveyor belt;
wherein:
the first conveyor belt, the second conveyor belt, the third conveyor belt, and the fourth conveyor belt are stacked one over the other along a vertical direction;
the second conveyor belt is spaced apart from the first conveyor belt;
the third conveyor belt is spaced apart from the first conveyor belt; and
the fourth conveyor belt is spaced apart from the first conveyor belt.

6. The recycling appliance of claim 5, wherein:
the dedicated input modules include:
a paper-material input module spaced apart from the organic-material input module;
a metal-material input module spaced apart from the organic-material input module;
a plastic-material input module spaced apart from the organic-material input module; and
a glass-material input module spaced apart from the organic-material input module.

7. The recycling appliance of claim 5, wherein:
the dedicated shredder modules include:

a dedicated paper-material shredder module for a paper-material input module;

a dedicated metal-material shredder module for a metal-material input module;

a dedicated plastic-material shredder module for a plastic-material input module; and a dedicated glass-material shredder module for a glass-material input module.

8. The recycling appliance of claim 5, wherein:

the dedicated output modules include:

a dedicated organic-material output module for the organic-material input module;

a dedicated paper-material output module for a paper-material input module;

a dedicated metal-material output module for a metal-material input module;

a dedicated plastic-material output module for a plastic-material input module; and a dedicated glass-material output module for a glass-material input module.

9. The recycling appliance of claim 5, wherein:

the input section includes:

dedicated chute modules including:

a dedicated organic-material chute module connecting the organic-material input module to a dedicated organic-material output module;

a dedicated paper-material chute module connecting a paper-material input module to a dedicated paper-material output module;

a dedicated metal-material chute module connecting a metal-material input module to a dedicated metal-material output module;

a dedicated plastic-material chute module connecting a plastic-material input module to a dedicated plastic-material output module; and a dedicated glass-material chute module connecting a glass-material input module to a dedicated glass-material output module.

10. The recycling appliance of claim 5, wherein:

the input section includes:

a dedicated organic-material power button for the organic-material input module;

a dedicated paper-material power button for a paper-material input module;

a dedicated metal-material power button for a metal-material input module;

a dedicated plastic-material power button for a plastic-material input module; and a dedicated glass-material power button for a glass-material input module.

11. The recycling appliance of claim 5, further comprising:

a control circuit being configured to control a motor assembly; and a user control panel being operatively connected to the control circuit, and the user control panel being configured to assist in controlled operation of the motor assembly.

12. The recycling appliance of claim 5, wherein:

the shredder section includes:

a motor assembly;

a power cord;

a motor drive-shaft assembly;

a gear-box assembly;

a drivable rotatable shaft;

a bearing support;

a shredder-section housing assembly; and shredder teeth;

wherein:

the shredder-section housing assembly is configured to house the motor assembly;

the motor assembly is fixedly mounted to an interior section of the shredder-section housing assembly;

the motor assembly is positioned in a vertical alignment within the shredder-section housing assembly;

the power cord extends from the motor assembly;

the power cord is configured to supply electric power to the motor assembly to drive the motor assembly;

the motor drive-shaft assembly extends from the motor assembly;

the motor drive-shaft assembly is operatively coupled to the gear-box assembly;

the gear-box assembly is fixedly mounted to the shredder-section housing assembly;

the drivable rotatable shaft is operatively coupled to the gear-box assembly in such a way that in response to rotation of the motor drive-shaft assembly of the motor assembly, the drivable rotatable shaft is rotated;

the drivable rotatable shaft is rotatably supported by the bearing support;

the drivable rotatable shaft extends through and along a length of the shredder section between the dedicated shredder modules;

the bearing support is positioned on opposite sides of the shredder-section housing assembly to the opposite lateral side walls of the shredder-section housing assembly; and the shredder teeth are mounted in each said dedicated shredder modules, and the shredder teeth are operatively mounted to the drivable rotatable shaft in such a way that once the drivable rotatable shaft is rotated, the shredder teeth are rotated to shred recyclable materials in each of the dedicated shredder modules.

13. The recycling appliance of claim 12, wherein:

paper-material shredder teeth are operatively mounted in a dedicated paper-material shredder module;

metal-material shredder teeth are operatively mounted in a dedicated metal-material shredder module;

plastic-material shredder teeth are operatively mounted in a dedicated plastic-material shredder module; and glass-material shredder teeth are operatively mounted in a dedicated glass-material shredder module.

14. The recycling appliance of claim 12, wherein:

the shredder teeth include at least one or more discs each having a peripherally disposed serrated cutting edge.

15. The recycling appliance of claim 12, wherein:

the shredder teeth include a set of shredding blades spaced apart from each other; and the drivable rotatable shaft includes a set of shafts that operatively rotate the set of shredding blades.

16. The recycling appliance of claim 5, further comprising:

the organic waste-treatment unit includes:

an organic waste-treatment housing assembly defining an organic-waste inlet configured to receive the wet organic waste material, and the organic waste-treatment housing assembly also defining an organic waste outlet configured to output the processed organic waste;

a heater assembly being operatively mounted to the organic waste-treatment housing assembly, and the heater assembly being configured to generate and radiate heat into the interior of the organic waste-treatment housing assembly, and the heat provided by the heater assembly being of an amount needed to extract excess moisture from the wet organic waste material as the wet organic waste material passes through the organic waste-treatment housing assembly;

an input fan unit being operatively mounted to the organic waste-treatment housing assembly, and the input fan unit being configured to move air through the organic waste-treatment housing assembly in such a way as to set up a hot air flow as a result of movement of air within the organic waste-treatment housing assembly;

an exhaust fan unit being operatively mounted to a wall of the organic waste-treatment housing assembly, and the exhaust fan unit being configured to exhaust warm air from the interior of the organic waste-treatment housing assembly; and wherein the conveyor assembly is configured to transport the wet organic waste material through and along the organic waste-treatment housing assembly, and the conveyor assembly is configured to receive the wet organic waste material.

17. The recycling appliance of claim 5, further comprising:
a compactor section including:
dedicated compactor modules for a respective dedicated output module.

18. The recycling appliance of claim 17, wherein:
the dedicated compactor modules include:
a dedicated organic-material compactor module for a dedicated organic-material output module;
a dedicated paper-material compactor module for a dedicated paper-material output module;
a dedicated metal-material compactor module for a dedicated metal-material output module;
a dedicated plastic-material compactor module for a dedicated plastic-material output module; and
a dedicated glass-material compactor module for a dedicated glass-material output module.

19. The recycling appliance of claim 17, wherein:
each of the dedicated compactor modules includes:
a container; and
a lid assembly operatively connected to a top section of the container; and
wherein:
a bag is insertable into the interior of the container, with an end section of the bag extending past the lid assembly.

20. The recycling appliance of claim 17, wherein:
each of the dedicated compactor modules includes:
a vacuum pack device being configured to further reduce a volume of the shredded recyclable materials in a bag.

* * * * *